United States Patent
Han et al.

(10) Patent No.: US 9,225,571 B2
(45) Date of Patent: Dec. 29, 2015

(54) METHOD FOR TRANSMITTING PREAMBLE FOR LEGACY SUPPORT

(75) Inventors: Seung Hee Han, Anyang-si (KR); Yeong Hyeon Kwon, Daejeon-si (KR); Jin Sam Kwak, Gunpo-si (KR); Dong Cheol Kim, Suwon-si (KR); Sung Ho Moon, Anyang-si (KR); Min Seok Noh, Seoul (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 749 days.

(21) Appl. No.: 12/810,283

(22) PCT Filed: Feb. 2, 2009

(86) PCT No.: PCT/KR2009/000508
§ 371 (c)(1),
(2), (4) Date: Jun. 23, 2010

(87) PCT Pub. No.: WO2009/096756
PCT Pub. Date: Aug. 6, 2009

(65) Prior Publication Data
US 2010/0284358 A1    Nov. 11, 2010

(30) Foreign Application Priority Data
Jun. 17, 2008   (KR) .................. 10-2008-0056805

(51) Int. Cl.
*H04L 27/26*    (2006.01)
*H04L 27/34*    (2006.01)
*H04L 27/32*    (2006.01)

(52) U.S. Cl.
CPC ........ *H04L 27/2613* (2013.01); *H04L 27/2602* (2013.01); *H04L 27/345* (2013.01); *H04L 27/26* (2013.01); *H04L 27/2601* (2013.01); *H04L 27/32* (2013.01); *H04L 27/34* (2013.01); *H04L 27/3405* (2013.01)

(58) Field of Classification Search
None
See application file for complete search history.

(56) References Cited

U.S. PATENT DOCUMENTS

| | | | |
|---|---|---|---|
| 7,289,774 B2 * | 10/2007 | Jorgensen ..................... | 455/103 |
| 7,885,214 B2 * | 2/2011 | Ahmadi et al. ............... | 370/295 |
| 8,005,182 B2 * | 8/2011 | Park et al. ..................... | 375/373 |
| 2006/0274839 A1 | 12/2006 | Fukuta et al. | |
| 2007/0150787 A1 | 6/2007 | Kim et al. | |
| 2009/0016464 A1 * | 1/2009 | Zheng et al. .................. | 375/295 |
| 2010/0278123 A1 * | 11/2010 | Fong et al. .................... | 370/329 |

FOREIGN PATENT DOCUMENTS

| KR | 10-2006-0029246 A | | 4/2006 |
|---|---|---|---|
| KR | 1020070065764 | * | 6/2007 |
| KR | 10-2007-0093767 | | 9/2007 |

* cited by examiner

*Primary Examiner* — Jae Y Lee
*Assistant Examiner* — Aixa Guadalupe-Cruz
(74) *Attorney, Agent, or Firm* — Dentons US LLP

(57) ABSTRACT

A method for transmitting a preamble for legacy support is provided. In a communication system for supporting at least one of a first system corresponding to a legacy system and a second system which corresponds to an evolved system and supports two or more scalable bandwidths, a method for transmitting a preamble for the second system is provided. A preamble sequence is generated on the basis of a smallest bandwidth of the two or more scalable bandwidths, the generated preamble sequence is mapped to a resource zone to have a repetition factor which is relatively prime to a repetition factor of a repetition factor of a preamble for the first system, and the preamble sequence mapped to the resource zone is transmitted as the preamble for the second system.

13 Claims, 10 Drawing Sheets

$A = \{a(0)\ a(1)\ a(2)\ ...\}$

METHOD FOR TRANSMITTING PREAMBLE FOR LEGACY SUPPORT

This application is a 35 U.S.C. §371 National Stage entry of International Application No. PCT/KR2009/000508, filed on Feb. 2, 2009, and claims priority to U.S. Provisional Application No. 61/025,810, filed Feb. 3, 2008 and Korean Application No. 10-2008-0056805, filed on Jun. 17, 2008 each of which is hereby incorporated by reference in its entirety as if fully set forth herein.

TECHNICAL FIELD

The present invention relates to a mobile communication system, and more particularly, to a method for generating and transmitting a preamble for legacy support.

BACKGROUND ART

In the following description, it is assumed that a "legacy system" indicates a system which is conventionally defined and an "evolved system" indicates is a system evolved from the legacy system or a newly defined system.

It is assumed that "legacy support" indicates support to the legacy system in a transmission/reception relationship with the evolved system, and satisfies the following two conditions.

1) A legacy base station (BS) and a legacy mobile station (MS) can transmit/receive a signal to/from each other without having an influence on the evolved system, and the legacy BS and an evolved MS can transmit/receive a signal to/from each other.

2) A BS which can support the legacy system and the evolved system can transmit/receive a signal to/from the legacy MS and the evolved MS.

Hereinafter, for convenience of description, it is assumed that the IEEE 802.16e system is used as the legacy system and the IEEE 802.16m system is used as the evolved system.

First, the IEEE 802.16e system which is an example of the legacy system will be briefly described. At this time, it is assumed that the IEEE 802.16e system uses a 1024 FFT mode, that is, a 10-MHz bandwidth.

FIG. 1 shows a downlink subframe structure of the IEEE 802.16e system.

In the downlink subframe structure shown in FIG. 1, only a preamble related to the present invention will be described. The preamble corresponds to one OFDM symbol and is transmitted to an uppermost side of every frame. Such a preamble is used for time/frequency synchronization, cell search, channel estimation, or the like.

FIG. 2 shows a set of preamble subcarriers of a $0^{th}$ segment in the IEEE 802.16e system.

As shown in FIG. 2, in the IEEE 802.16e system, both sides of a given bandwidth are used as protective bands, sequence is inserted in the remaining area at an interval of three subcarriers in consideration of three sectors corresponding to each segment, and 0 is inserted into a section into which the sequence is not inserted. A preamble of a first segment is inserted into frequency indexes 1, 4, 7, 10, . . . , 844, 847, and 849 and a preamble of a second segment is inserted into frequency indexes 2, 5, 8, 11, . . . , 845, and 848. If the sequence is inserted at the interval of three subcarriers in a frequency domain, the same effect as three-time repetition of the same sequence in predetermined units is obtained in a time domain, in view of the amplitude thereof.

That is, in the above-described IEEE 802.16e system, a preamble repetition factor is 3.

A portion of the sequence used in the preamble is shown by Table 1.

TABLE 1

| Index | IDcell | Segment | Sequence value (hexadecimal) |
|---|---|---|---|
| 0 | 0 | 0 | A6F294537B285E1844677D133E4D53 CCB1F182DE00489E53E6B6E77065C7 EE7D0ADBEAF |
| 1 | 1 | 0 | 321CBBE7F462E6C2A07E8BBDA2C7F7 946D5F69E35AC8ACF7D64AB4A33C46 7001F3B2 |
| 2 | 2 | 0 | C75D30B2DF72CEC9117A0BD8EAF8E0 502461FC07456AC906ADE03E9B5AB5 E1D3F98C6E |
| ... | ... | ... | ... |

As shown in Table 1, the sequence used in the preamble is set by a segment number and an IDcell parameter value. The defined sequence is converted into a binary signal in ascending order and is mapped to subcarriers by a BPSK modulation scheme. In other words, a hexadecimal sequence is converted into a binary sequence Wk and the binary sequence Wk is mapped from a most significant bit (MSB) to a least significant bit (LSB). At this time, 0 is mapped to +1 and 1 is mapped to −1. For example, since Wk is 110000010010 . . . $0^{th}$ segment having an index of 0, the converted binary code values are −1 −1 +1 +1 +1 +1 +1 −1 +1 +1 −1 +1 . . . .

The sequence used in the preamble of the IEEE 802.16e system is composed of binary codes inserted in the frequency domain. This sequence is a sequence having a low peak-to-average ratio (PAPR), which is found by computer search when converting into the time domain while maintaining correlation characteristics to a certain extent, among the sequences composed of the binary codes. A preamble for the evolved system of the IEEE 802.16e system, that is, the IEEE 802.16m system, is not suggested in detail.

Accordingly, a method for utilizing the preamble for the IEEE 802.16e system which is the legacy system in the preamble for the IEEE 802.16m system without change may be considered. However, in this case, the following problems are generated.

First, in the IEEE 802.16e system, the sequence is inserted at an interval of three subcarriers in the frequency domain on the basis of a sector or a segment. For example, it is assumed that the preamble is transmitted via the subcarriers corresponding to 3k (k is an integer) in a sector 0, 3k+1 in a sector 1 and 3k+2 in a sector 2, and the remaining portion is transmitted via 0. A preamble reception signal having three-time repetition structure in a time domain is preferably subjected to time synchronization via auto-correlation. Accordingly, when such a repetition pattern is held even in the receiver, it is advantageous to acquire time synchronization of the receiver. The preamble for the IEEE 802.16e system is transmitted using a frequency location which varies according to sectors as described above. If preamble signals are repeatedly received from sectors 0, 1 and 2, the receiver cannot hold the repetition waveform in the received signal since the structure in which the sequence is inserted at the interval of three subcarriers is destroyed. Accordingly, in case of an MS located in the boundary between cells, time synchronization performance significantly deteriorates and complexity needs to be significantly increased.

If the evolved system such as the IEEE 802.16m supports a scalable bandwidth, a preamble based on 10 MHz used in the IEEE 802.16e is not suitable for the IEEE 802.16m. For example, the supportable bandwidth of the evolved system is 5 MHz, 10 MHz, 15 MHz and 20 MHz, the preamble for the IEEE 802.16e cannot be used in the system using a minimum transmission bandwidth of 5 MHz without change.

If both the legacy system and the evolved system are simultaneously supported, the two systems may be multiplexed by any one of time division multiplexing (TDM), code division multiplexing (CDM) and frequency division multiplexing (FDM). It is preferable that an evolved BS recognizes that an evolved MS is present in an evolved zone (or an evolved system support zone) without having an influence on a legacy BS and a legacy MS and knows a start location (that is, timing synchronization) of the evolved zone. However, it is difficult to support such a function if a legacy preamble is utilized as an evolved preamble without change or if only the legacy preamble is used. In addition, as described above, if the location or the start location of an evolved zone in a frame is not informed to the evolved MS, unnecessary delay may occur. For example, it is assumed that, if a BS for transmitting a legacy preamble is present and the evolved preamble is not detected during a predetermined time after an MS tries to search for the evolved preamble, a legacy preamble is searched for. In this case, since the MS searches for the evolved preamble at a time point when the legacy preamble is transmitted, a meaningless operation is performed over a significantly long period of time.

If the evolved preamble has the same repetition pattern as the legacy preamble, the MS may generate a false alarm in a preamble zone of a place where symbol synchronization is performed.

DISCLOSURE

Technical Problem

An object of the present invention devised to solve the problem lies on a method for generating and transmitting a preamble for an evolved system, which is capable of easily supporting a scalable bandwidth and preventing confusion with a preamble for a legacy system.

Another object of the present invention devised to solve the problem lies on a method for allowing an evolved MS to know whether or not a zone for an evolved system is present in a preamble and a start location of the zone for the evolved system without having an influence on the communication between a legacy BS and a legacy MS.

A further object of the present invention devised to solve the problem lies on a method for allowing an evolved MS to be connected to an initial network without recognizing a legacy preamble.

Technical Solution

The object of the present invention can be achieved by providing a method for transmitting a preamble for a second system in a communication system for supporting at least one of a first system and the second system for supporting two or more scalable bandwidths. The method includes generating a preamble sequence on the basis of a smallest bandwidth of the two or more scalable bandwidths, mapping the generated preamble sequence to a resource zone to have a repetition factor which is relatively prime to a repetition factor of a preamble for the first system, and transmitting the preamble sequence mapped to the resource zone as the preamble for the second system.

At this time, the preamble for the second system may be transmitted together with the preamble for the first system, and the preamble for the second system may be transmitted together with indication information for informing a mobile station which supports the second system of the existence of a zone for supporting the second system in a frame and a start location of the zone for supporting the second system.

In addition, the indication information may be transmitted using field information which is not read by a base station for the first system and a mobile station for the first system, and the indication information may be a downlink frame prefix (DLFP).

In the mapping of the preamble sequence to the resource zone, a binary form of the generated preamble sequence is mapped to a frequency domain subcarrier in the unit of intervals corresponding to the repetition factor which is relatively prime to the repetition factor of the preamble for the first system.

In the above-described embodiment, it is assumed that the first system may be the IEEE 802.16e system and the second system may be the IEEE 802.16m system.

In this case, the two or more scalable bandwidths may be 5 MHz, 10 MHz, 15 MHz and 20 MHz, and the generated preamble sequence may be generated on the basis of the bandwidth of 5 MHz.

In addition, the repetition factor of the preamble for the first system may be 3, and the generated preamble sequence may be mapped to the resource zone so as to have a repetition factor of 1 or 2.

Advantageous Effects

According to the present invention, when a scalable bandwidth of an evolved system can be supported and a preamble for the evolved system is set to have a repetition factor which is relatively prime to a repetition factor of a legacy system, it is possible to eliminate a false alarm which may be generated due to a preamble for the legacy system and improve detection performance.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Figure 1:
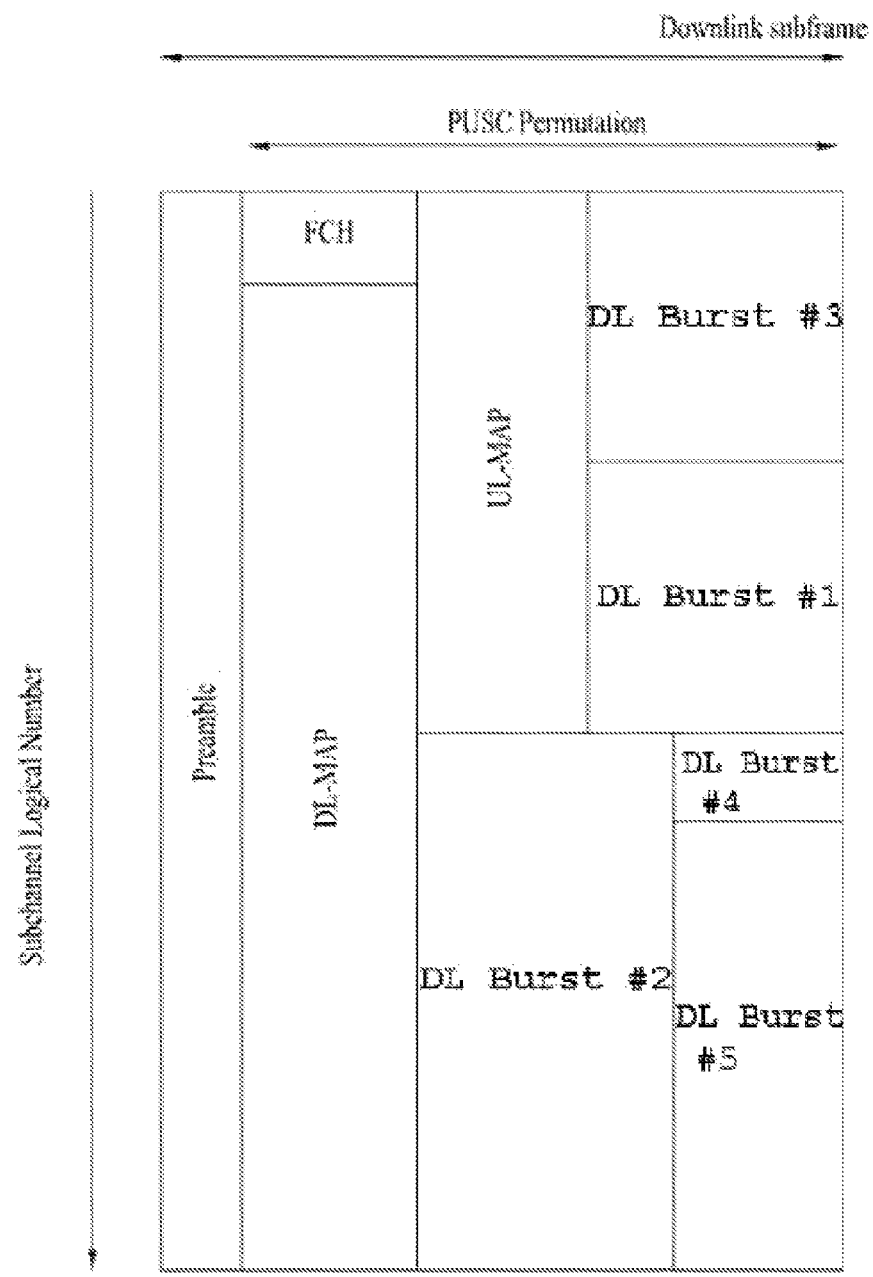
FIG. 1 is a view showing a downlink subframe structure of the IEEE 802.16e system.
Figure 2:
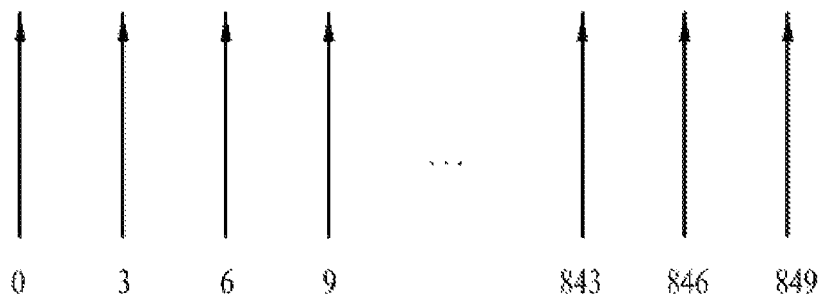
FIG. 2 is a view showing a set of preamble subcarriers of a $0^{th}$ segment in the IEEE 802.16e system.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced.

The detailed description includes details for the purpose of providing an understanding of the present invention. However, it will be apparent to those skilled in the art that these teachings may be implemented and practiced without these specific details. In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, a "preamble" may be referred to as a synchronization channel (SCH) or may be divided into a primary SCH and a secondary SCH according to the detailed system design. The primary SCH may be used for obtaining at least one of a time/frequency synchronization, bandwidth (BW)/cyclic prefix (CP) configuration information and a partial cell ID (e.g. sector ID). And the secondary SCH may be used for obtaining at least a total cell ID information. The present invention can be applied at least one of the primary SCH and the secondary SCH. And the primary and secondary SCHs may be called as primary advanced SCH (PA-SCH) and secondary advanced SCH (SA-SCH) in the evolved system, such as IEEE 802.16m system.

First, the present invention will be described in view of the following three aspects.

In an aspect of the present invention, a method for generating and transmitting a preamble on the basis of a smallest bandwidth in an evolved system for supporting at least one scalable bandwidth is suggested. For example, if it is assumed that the evolved system supports transmission bandwidths of 5 MHz, 10 MHz, 15 MHz and 20 MHz, a preamble for the evolved system is generated on the basis of 5 MHz. At this time, an actual preamble is preferably generated to correspond to a bandwidth slightly smaller than 5 MHz in consideration of a guard interval of a system bandwidth boundary portion. Accordingly, it is possible to flexibly design a preamble in an evolved system for supporting a scalable bandwidth.

In another aspect of the present invention, for a legacy support mode, mapping of a preamble for an evolved system to a resource zone so as to have a repetition factor which is relatively prime to a repetition factor of a legacy preamble or so as not to have a repetition form is suggested. The term "repetition factor" may be defined as a subcarrier interval in which the sequence element is inserted in the frequency domain. The mapping of the preamble sequence to the resource zone may be mapping of a sequence to a subcarrier in the unit of an interval corresponding to a repetition factor in a frequency domain or mapping of a sequence to a subcarrier without the same interval. In this case, since the repetition factors of the evolved preamble and the legacy preamble are different from each other, it is possible to eliminate a false alarm which may be generated in an MS and improve preamble detection performance of the MS.

In another aspect of the present invention, in a system for simultaneously providing a legacy service and an evolved service, transmission of the suggested evolved preamble independent of the legacy preamble is suggested. At this time, an evolved BS may inform an evolved MS whether or not an evolved zone is present using all or a portion of four bits reserved in a downlink frame prefix (DLFP) in which information is ignored by a legacy MS. Accordingly, the evolved BS can allow an evolved MS to efficiently recognize whether or not a zone for an evolved system is present in a frame and a start location of the zone, without having an influence on the legacy BS and the legacy MS. In particular, if the recognition information of the evolved zone is informed via the DLFP, the evolved MS may efficiently search for the evolved zone regardless of MS implementation priority.

Hereinafter, the aspects of the present invention will be described in detail.

First Aspect—Preamble for Supporting Scalable Bandwidth

In the present embodiment, a method for generating and transmitting a preamble for an evolved system on the basis of a minimum system bandwidth of bandwidths supported by the evolved system is suggested. This preamble may be equally used in all system bandwidths.

Figure 3:
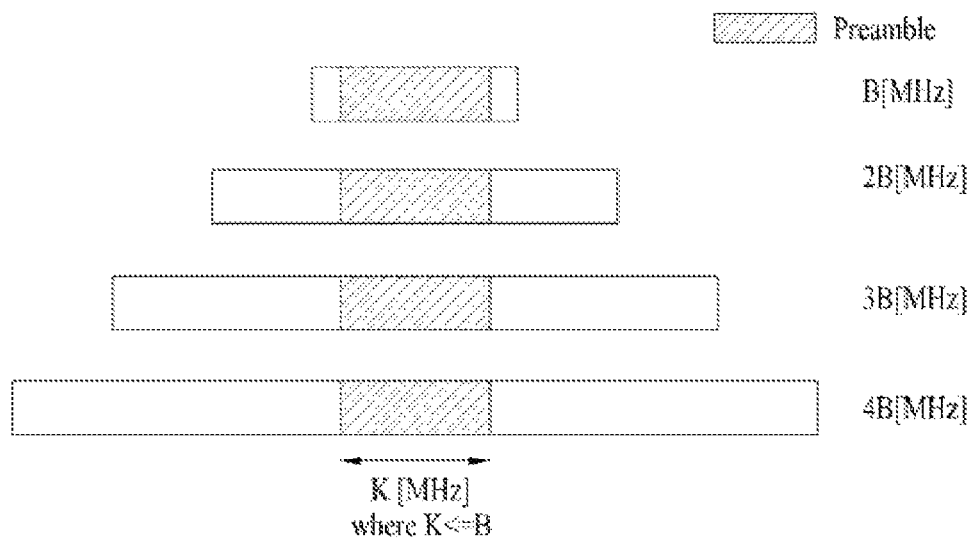
FIG. 3 is a view showing an example of a preamble of an evolved system for supporting a scalable bandwidth according to an embodiment of the present invention.

FIG. 3 is a view showing an example of a preamble for an evolved system for supporting a scalable bandwidth according to an embodiment of the present invention.

That is, in FIG. 3, it is assumed the evolved system can utilize four system bandwidths of B [MHz], 2*B [MHz], 3*B [MHz] and 4*B [MHz]. It is assumed that the preamble is transmitted via a central portion of each of the bandwidths and corresponds to K [MHz]. In this case, it is preferable that the preamble smaller than B which is a minimum transmission bandwidth is transmitted in consideration of allocation of another channel to an adjacent frequency band.

When the preamble of the evolved system is designed, since an MS which searches for a cell searches for only K [MHz] so as to perform cell search regardless of the supported system bandwidth, it is possible to efficiently perform a cell search process.

Second Aspect—Setting of Repetition Factor which is Relatively Prime to Repetition Factor of Preamble for Legacy System As described above, insertion of a certain signal in a frequency domain at the same interval of N subcarriers is equal to N-time repetitions in a time domain. For example, in case of N=2, a time domain signal is repeated two times, and, in case of N=3, the time domain signal is repeated three times. When the same signal is inserted in the frequency domain at the same interval of N subcarriers and/or a signal is repeated in the time domain in the unit of predetermined blocks in view of the amplitude of the signal, N is defined as a "repetition factor". In addition, a form in which signals are different in the phase thereof and are equal in the amplitude thereof in the unit of blocks in the time domain (e.g., A and Aexp(j*2pi*n/M) ("A" is a vector, e.g., A=[a0 a1 a2 ... a(n−1)]) are defined as a repetition form.

FIGS. 4 to 8 are views explaining a signal repetition generation form.

Figure 4:
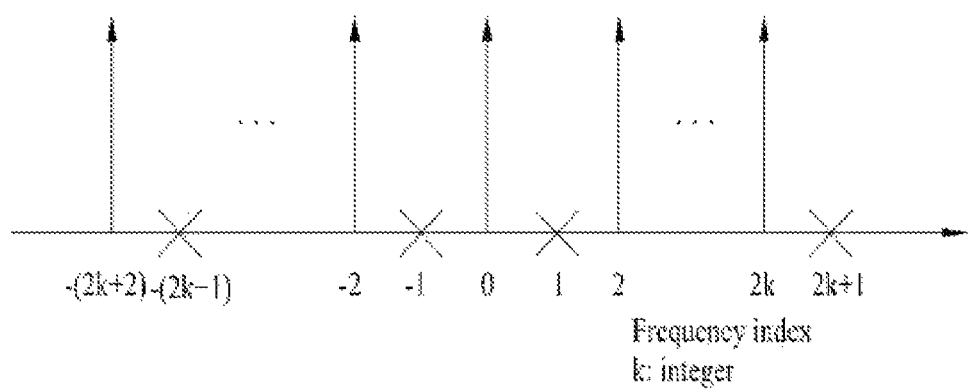
FIGS. 4 to 8 are views explaining a signal repetition generation form.
Figure 4:
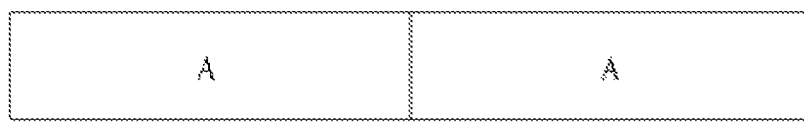
Figure 5:
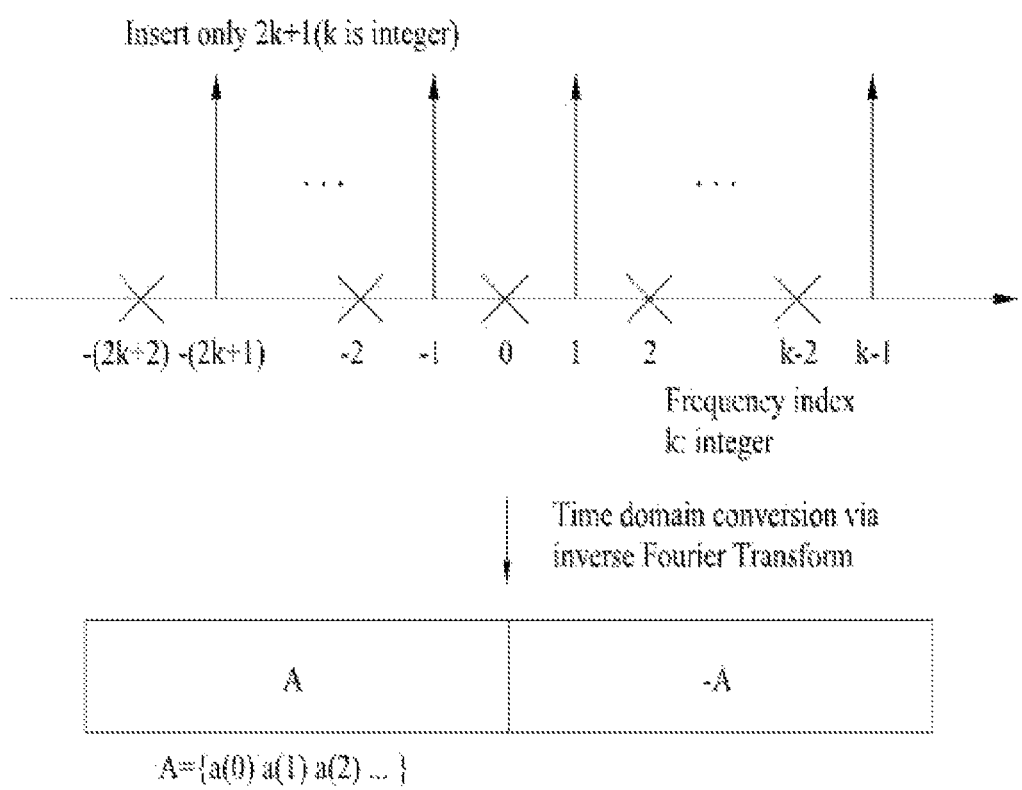

In detail, FIG. 4 shows a case where a repetition factor N is 2 and a sequence is mapped to only a subcarrier index 2k (k is an integer) and FIG. 5 shows a case where a repetition factor N is 2 and a sequence is mapped to only a subcarrier index 2k+1 (k is an integer). In this case, a time domain signal appears in a form in which the same signal is repeated two times. As shown in FIG. 5, when the signals are equal in the amplitude thereof and are different in only the phase, it may be considered that the same signal is repeated.

Figure 6:
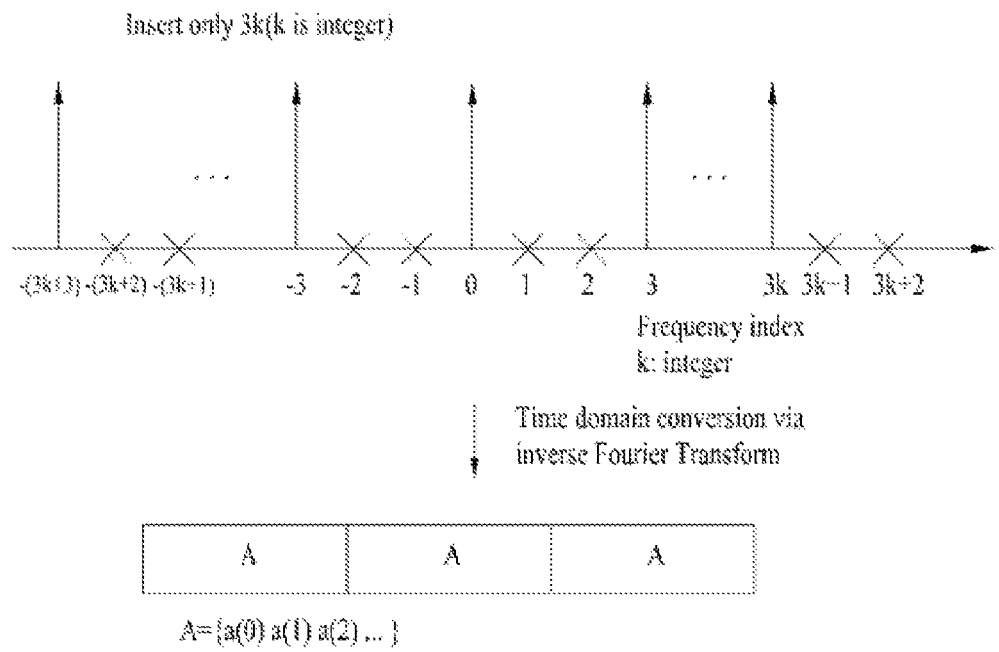
Figure 7:
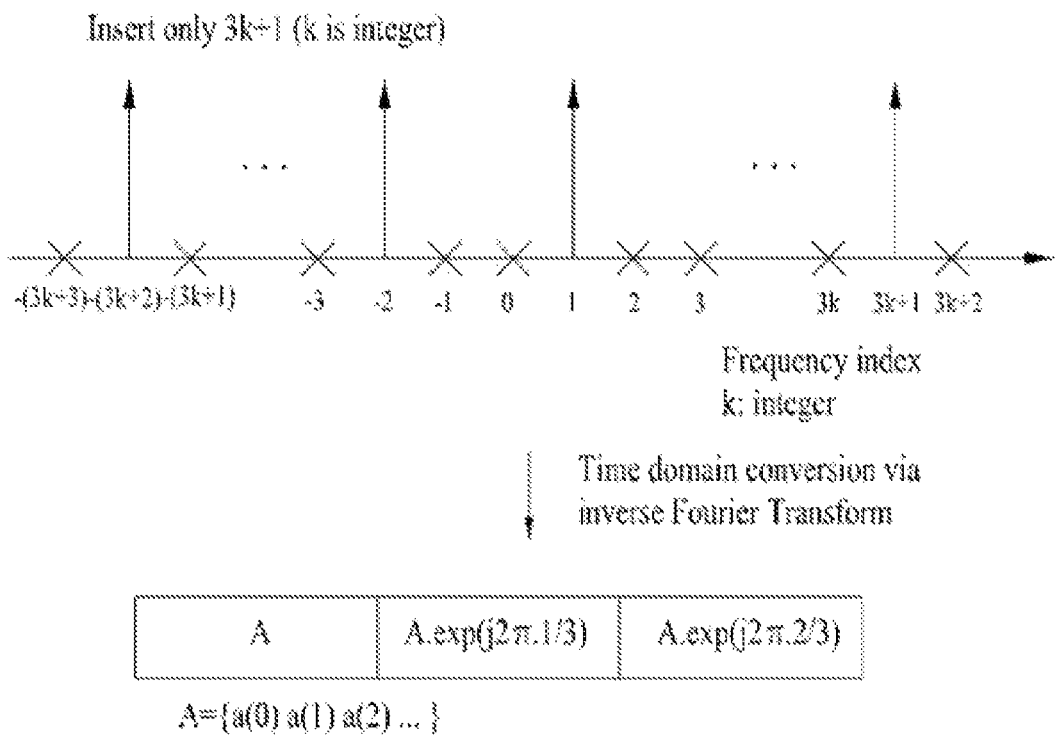
Figure 8:
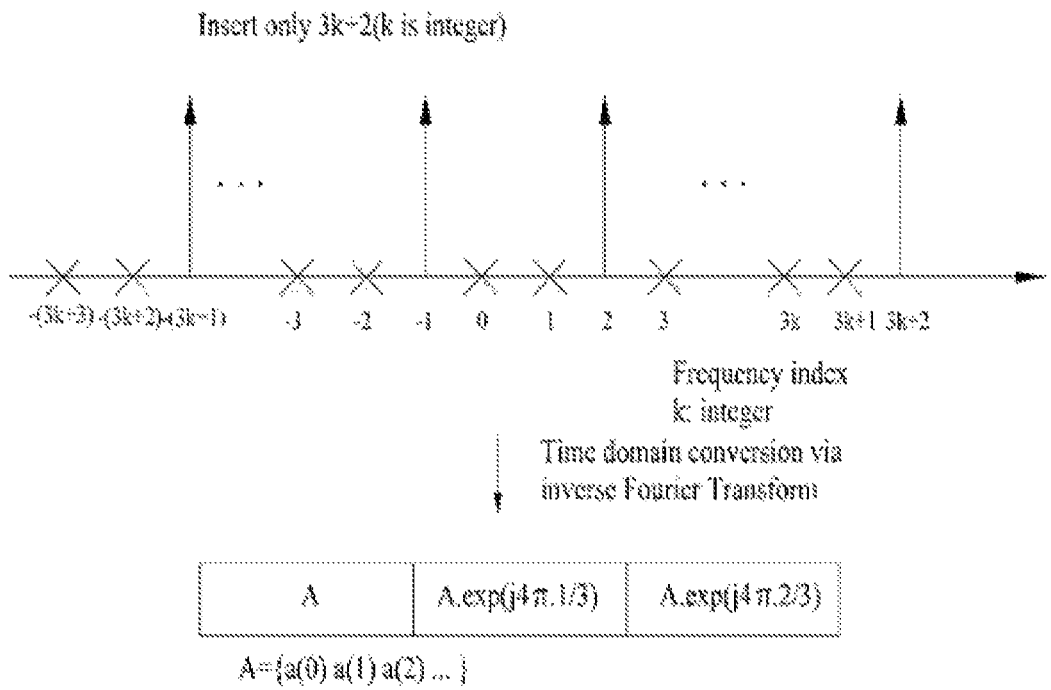

FIG. 6 shows a case where a repetition factor N is 3 and a sequence is mapped to only a subcarrier index 3k (k is an integer), FIG. 7 shows a case where a repetition factor N is 3 and a sequence is mapped to only a subcarrier index 3k+1 (k is an integer), and FIG. 8 shows a case where a repetition factor N is 3 and a sequence is mapped to only a subcarrier index 3k+2 (k is an integer). In these cases, it can be confirmed that the signals are repeated three times in the time domain (including the case where the phase of the signal is changed).

The repetition factor condition of the preamble for the evolved system will be described using such a principle. Hereinafter, it is defined that two integers are relatively prime if they have no common factors other than 1.

For example, it is assumed that a preamble for a legacy system (hereinafter, referred to as a "legacy preamble") having a repetition factor of 3 is present and a preamble for an evolved system (hereinafter, referred to as a "evolved preamble) uses the legacy preamble without change. In this case, the legacy preamble and the evolved preamble have the same repetition factor which is not relatively prime.

It is assumed that a BS transmits the legacy preamble and an evolved MS tries to search for the evolved preamble. At this time, the evolved MS considers the legacy preamble as the evolved preamble and continuously tries to search for the evolved preamble at a location corresponding thereto. Such a false alarm may increase the complexity of the MS and the consumption of a battery, thereby generating an adverse effect.

The above-described false alarm is not limited to the case where the legacy preamble and the evolved preamble have the same repetition factor. For example, it is assumed that a legacy preamble having a repetition factor of 3 is present and the repetition factor of an evolved preamble is 6 which is not relatively prime to 3. This case will be described with reference to the following drawing.

Figure 9:
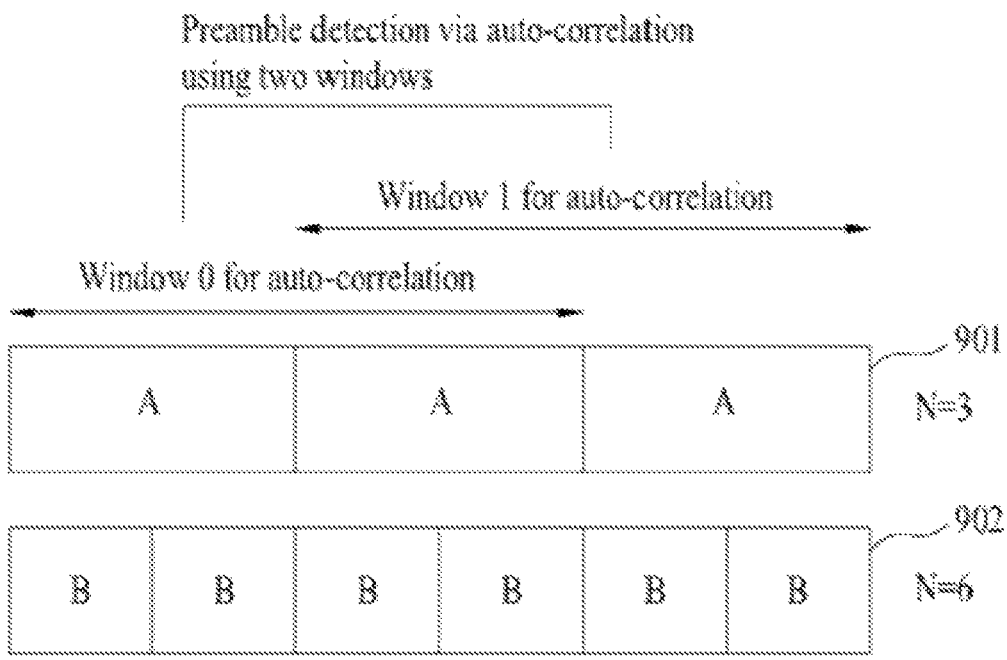
FIG. 9 is a view explaining an example of a false alarm which may be generated when repetition factors of a legacy preamble and an evolved preamble are not relatively prime.

FIG. 9 is a view explaining a false alarm which may be generated when repetition factors of a legacy preamble and an evolved preamble are not relatively prime.

In detail, a pattern 901 shown in the upper side of the drawing is a time domain pattern of a legacy preamble having a repetition factor of 3 and a pattern 902 shown in the lower side thereof is a time domain pattern of an evolved preamble having a repetition factor of 6. If auto-correlation is used for time synchronization of the preamble, as shown in FIG. 9, two windows may be used. In detail, time synchronization may be performed via correlation between the signal values of a window 0 and a window 1 (that is, via auto-correlation in a received signal). At this time, if the repetition factors of the legacy preamble and the evolved preamble are not relatively prime, although the repetition factors thereof are different, it is determined that the sequences detected by the two windows are equal and thus the false alarm may be generated.

Accordingly, in the present embodiment, by setting the repetition factor of the evolved preamble to be relatively prime to the repetition factor of the legacy preamble, the above-described ambiguity and false alarm can be solved.

Figure 10:
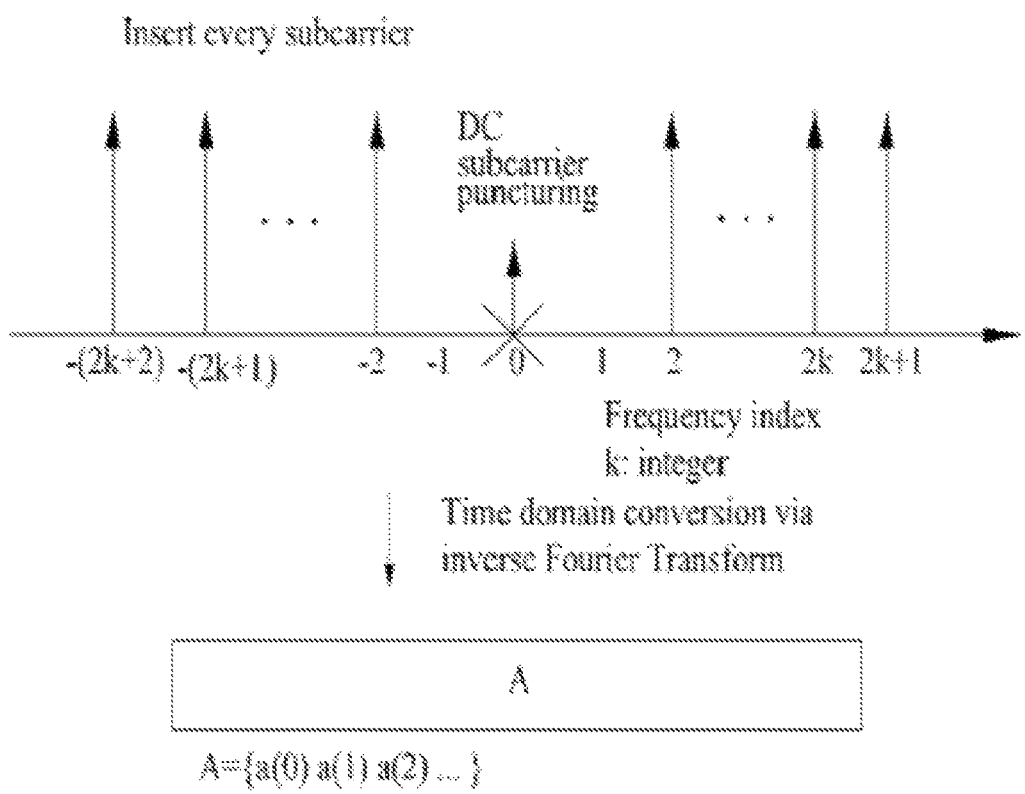
FIGS. 10 to 12 are views showing an evolved preamble according to an exemplary embodiment of the invention when the repetition factor of a legacy preamble is 3.

For example, if the repetition factor of the legacy preamble is 3, the repetition factor of the evolved preamble is preferably 1 or 2. FIG. 10 shows a case where the repetition factor of the evolved preamble is set to 1 and FIGS. 11 and 12 show a case where the repetition factor of the evolved preamble is set to 2, when the legacy preamble shown in FIG. 6, 7 or 8 (that is, the repetition factor=3) is used.

Figure 11:
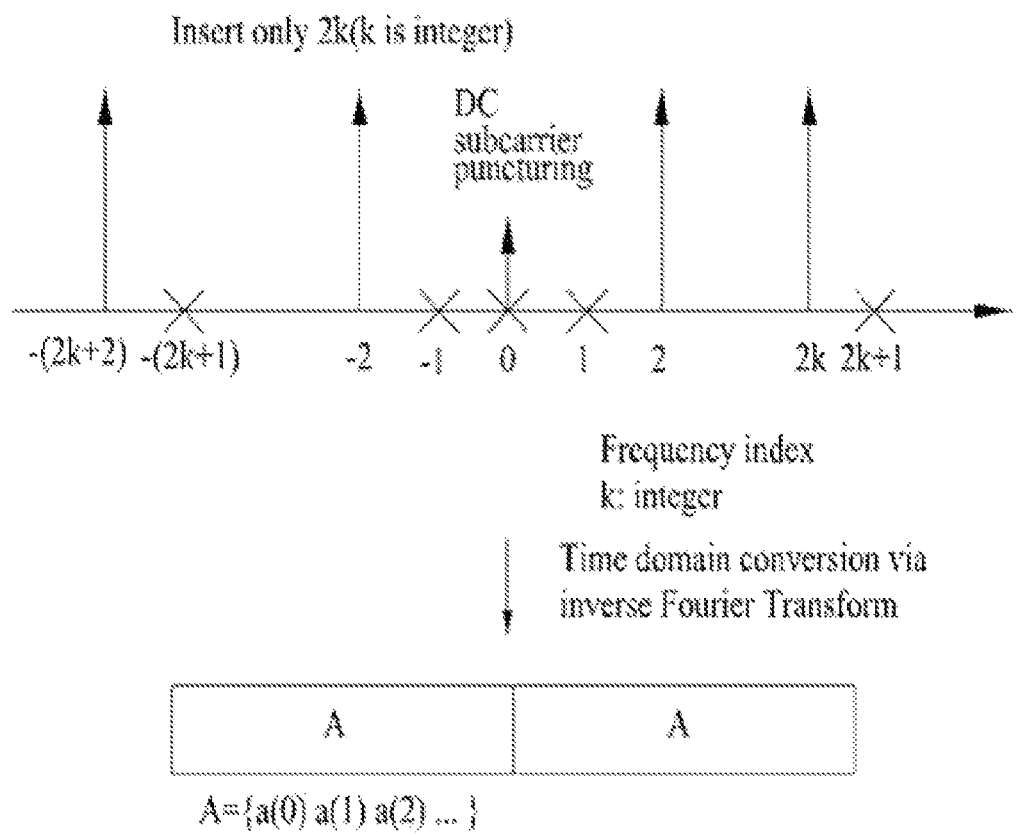
Figure 12:
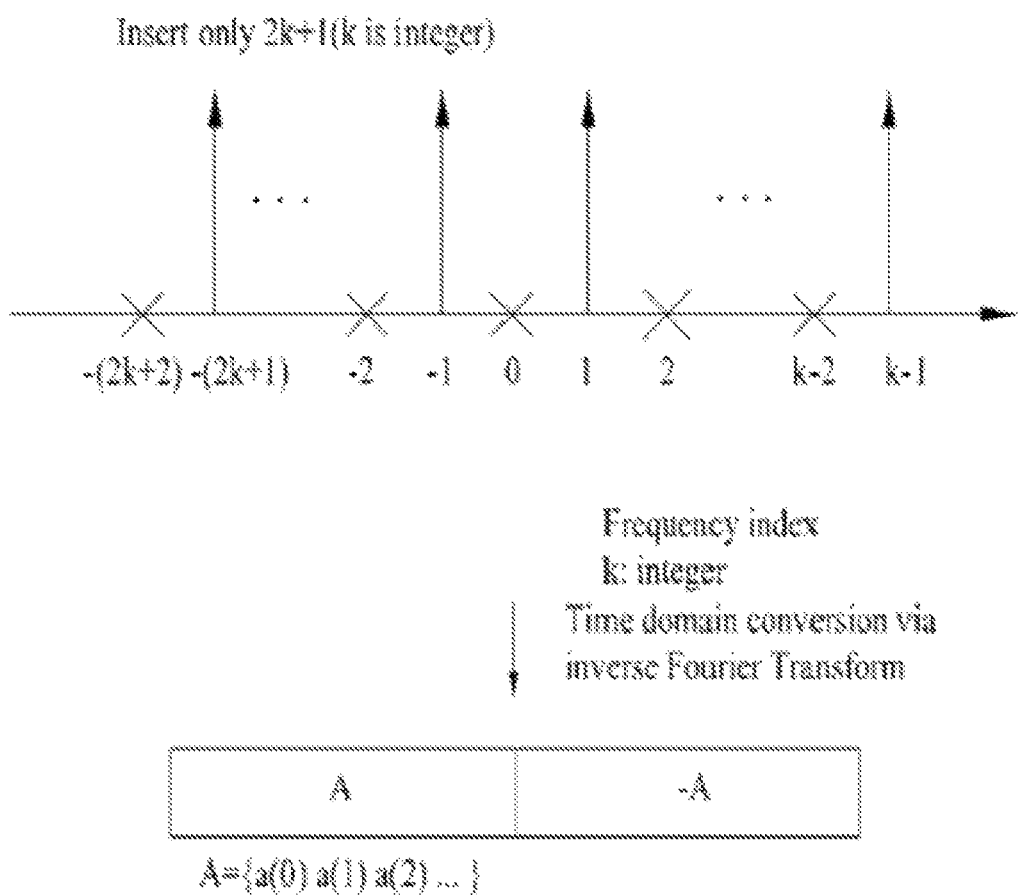

FIGS. 10 to 12 are views showing an evolved preamble according to an exemplary embodiment of the invention, when the repetition factor of a legacy preamble is 3.

In detail, FIG. 10 shows a case where a sequence is mapped to every subcarrier, that is, the repetition factor is 1, and FIG. 11 shows an example in which a sequence is mapped to a subcarrier index 2k (k is an integer) such that the repetition factor becomes 2. In addition, FIG. 12 shows an example in which a sequence is mapped to a subcarrier index 2k+1 (k is an integer) such that the repetition factor becomes 2. In particular, FIGS. 10 and 11 show DC subcarrier puncturing, in which the signal mapped to the DC subcarrier is discarded.

Third Aspect—Simultaneous Transmission of Preamble for Legacy System and Preamble for Evolved System In the present embodiment, in a system for simultaneously providing a legacy service and an evolved service, a scalable bandwidth problem of an evolved system is solved, and a legacy preamble and an evolved preamble are simultaneously transmitted in order to recognize whether or not an evolved zone is present in a frame and a start point of the evolved zone. At this time, an evolved BS may inform an evolved MS whether an evolved service zone is present in a frame and/or start point location information of the evolved service zone using specific control field information in which the information is ignored by the legacy MS. All or a portion of four bits reserved in the DLFP in which the information is ignored by the legacy MS is used as the specific control field and the specific control field is not limited to this.

If both the legacy system and the evolved system are supported, the two systems may be multiplexed by TDM/CDM/FDM. Hereinafter, for convenience of description, it is assumed that the systems are multiplexed by the TDM.

As described above, if the evolved system and the legacy system are multiplexed by the TDM, the evolved MS preferably recognizes that the evolved zone is present in the frame and the start location (timing synchronization) of the evolved zone, without having an influence on the legacy BS and the legacy MS. However, if the legacy preamble is used without change as the evolved preamble or if only the legacy preamble is transmitted even when the evolved system and the legacy system are simultaneously supported, it is difficult to allow the evolved MS to recognize whether or not the evolved zone is present and the start point location of the evolved zone, as described above.

For example, in order to know the location of the evolved zone without transmitting the evolved preamble together, a method for informing the evolved MS of the above-described information via control signaling such as DL-MAP in a legacy zone may be used. However, this method is not suitable since it has an influence on the operation of the legacy MS.

Accordingly, in the present embodiment, in order to inform the evolved MS of the existence/non-existence of an evolved zone is present in the frame and the start point location of the evolved zone without having an influence on the legacy MS, a method for simultaneously transmitting the evolved preamble and the legacy preamble if both systems are simultaneously supported and informing the evolved MS of the existence/non-existence of the evolved zone in the frame and the start point location using the specific control field in which the information is ignored by the legacy MS is suggested.

Figure 13:
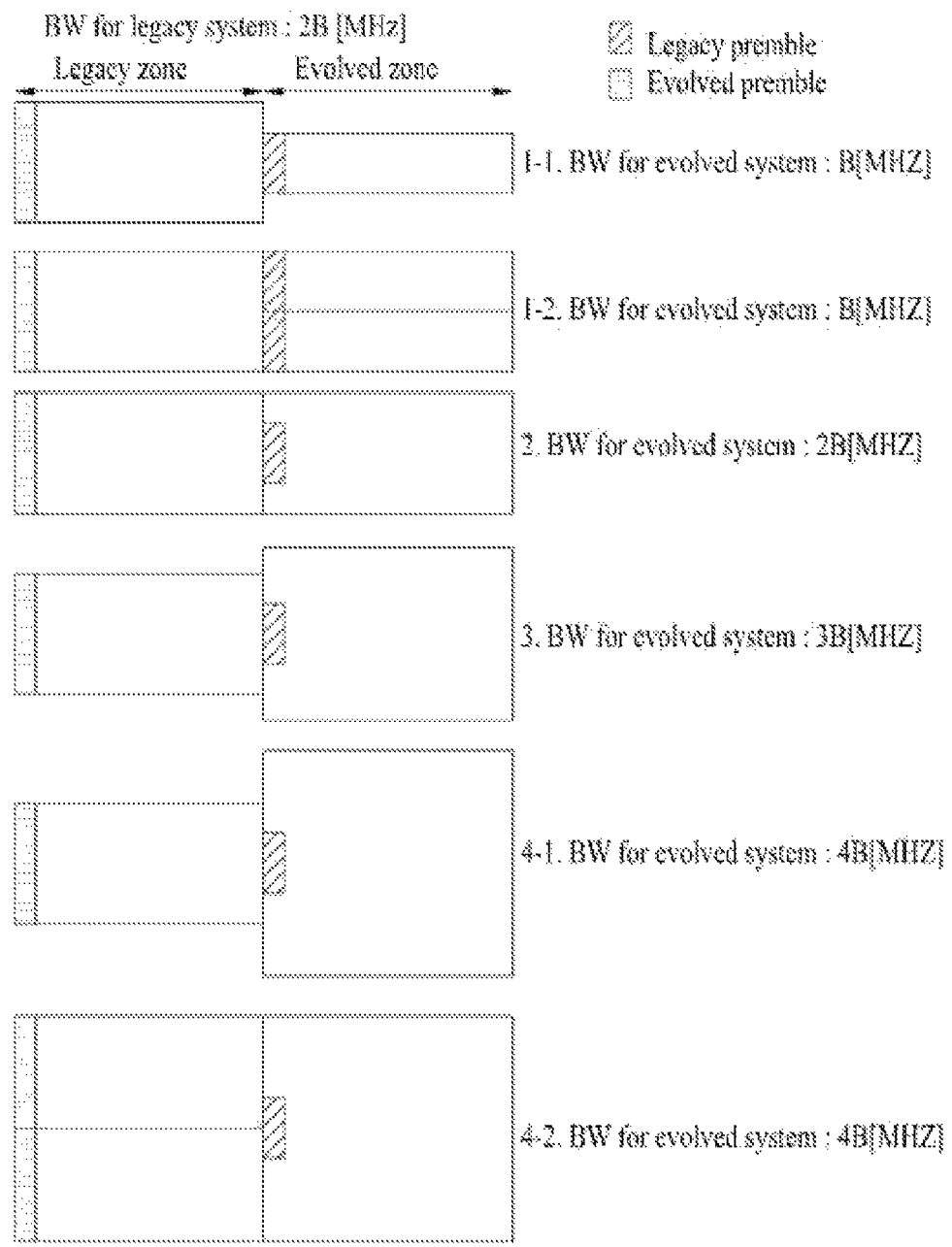
FIG. 13 is a view showing a form, in which a legacy preamble and an evolved preamble are simultaneously transmitted, according to an embodiment of the present invention.

FIG. 13 is a view showing a form, in which a legacy preamble and an evolved preamble are simultaneously transmitted, according to an embodiment of the present invention.

First, the left side of FIG. 13 shows a legacy zone and the right side thereof shows an evolved zone. It is assumed that the bandwidth of the legacy system is fixed to 2B [MHz] and the bandwidth of the evolved system may be B, 2B, 3B and 4B [MHz]. As shown in FIG. 13, in these cases, it is preferable that the legacy preamble and the evolved preamble are simultaneously transmitted. The evolved preamble is generated and transmitted on the basis of a smallest bandwidth B [MHz] of the bandwidths B, 2B, 3B and 4B of the evolved system. If 5 MHz, 10 MHz, 15 MHz and 20 MHz are considered as a supportable scalable bandwidth, B may be 5 MHz in the above-described example with respect to FIG. 13.

Preferably, like the third case of the top of FIG. 13, the evolved preamble is transmitted in a state in which a central frequency thereof is matched to that of the legacy preamble. Although the system utilizes various bandwidths, it is possible to improve preamble detection performance by simply checking the preamble detection locations of the systems.

The present invention is to solve the problems which occur when the preamble for the evolved system is not newly defined and the preamble for the legacy system is used without change. When the scalable bandwidth of the evolved system can be supported and the preamble for the evolved system is set to have the repetition factor which is relatively prime to the repetition factor of the legacy system, it is possible to eliminate a false alarm which may be generated due to the preamble for the legacy system and improve detection performance.

In addition, it is possible to solve the inherent problems such as deterioration of the detection performance of the legacy preamble in a cell boundary and improve detection performance by solving such problems in the evolved preamble.

In addition, if the legacy zone and the evolved zone are multiplexed by the TDM, the legacy preamble and the evolved preamble are simultaneously transmitted such that the evolved zone can be easily detected.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability

A method for transmitting a preamble according to an embodiment of the present invention will be described in a state in which it is assumed that the IEEE 802.16e system is used as a legacy system and the IEEE 802.16m system is used as an evolved system. The range of the present invention is not limited to the above-described case and is applicable to a mobile communication system for simultaneously supporting two systems.

The invention claimed is:

1. A method for transmitting a preamble for a second system supporting a first system, the method comprising:
   allocating a preamble sequence generated based on a predetermined bandwidth to a plurality of subcarriers having a second repetition factor, wherein the second repetition factor and a first repetition factor of a preamble for the first system are relatively prime; and
   transmitting the preamble sequence mapped to have the second repetition factor for the second system,
   wherein the first repetition factor is 3, and the second repetition factor is 2, and
   wherein the generated preamble sequence is allocated to every two subcarriers in a frequency domain.

2. The method according to claim 1, wherein the preamble for the second system supports time synchronization by an auto-correlation using a repetition waveform.

3. The method according to claim 1, wherein a binary value form of the generated preamble sequence is allocated to a frequency domain subcarrier in a unit of intervals corresponding to the second repetition factor, in mapping the preamble sequence to the plurality of subcarriers.

4. The method according to claim 1, wherein the preamble for the second system is transmitted together with the preamble for the first system at the legacy support mode.

5. The method according to claim 1, wherein the first system is an IEEE 802.16e system and the second system is an IEEE 802.16m system.

6. The method according to claim 5, wherein the second system can support bandwidths of 5 MHz, 10 MHz, 15 MHz and 20 MHz, and the generated preamble sequence is generated on a basis of the bandwidth of 5 MHz.

7. The method according to claim 1, wherein the preamble for the second system is a primary synchronization channel (P-SCH).

8. The method according to claim 1, further comprising transmitting indication information whether the first system and the second system coexist.

9. The method according to claim 8, wherein the indication information is transmitted using field information which is not read by a base station for the first system and a mobile station for the first system.

10. The method according to claim 9, wherein the indication information is transmitted using a downlink frame prefix (DLFP).

11. The method according to claim 1, wherein the preamble for the second system is multiplexed with the preamble for the first system by time division multiplexing (TDM).

12. The method according to claim 11, wherein a size of the preamble for the first system is 10 MHz.

13. The method according to claim 1, wherein the preamble sequence is not allocated to a DC subcarrier.

* * * * *